(12) United States Patent  (10) Patent No.: US 9,400,758 B2
Song et al.  (45) Date of Patent: Jul. 26, 2016

(54) RESET METHOD AND NETWORK DEVICE

(71) Applicant: Huawei Technologies Co., Ltd., Shenzhen, Guangdong (CN)

(72) Inventors: Kuichao Song, Nanjing (CN); Junyang Rao, Nanjing (CN); Qiang Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 14/072,704

(22) Filed: Nov. 5, 2013

(65) Prior Publication Data

US 2014/0136744 A1  May 15, 2014

(30) Foreign Application Priority Data

Nov. 9, 2012 (CN) .......................... 2012 1 0447224

(51) Int. Cl.
| | |
|---|---|
| *G06F 13/14* | (2006.01) |
| *G06F 13/24* | (2006.01) |
| *G06F 1/24* | (2006.01) |
| *G06F 11/14* | (2006.01) |
| *G06F 12/02* | (2006.01) |

(52) U.S. Cl.
CPC ........ *G06F 13/24* (2013.01); *G06F 1/24* (2013.01); *G06F 11/1441* (2013.01); *G06F 12/0246* (2013.01); *G06F 13/14* (2013.01)

(58) Field of Classification Search
USPC ........ 710/48, 52, 59, 105, 110, 305, 313, 266
See application file for complete search history.

(56) References Cited

U.S. PATENT DOCUMENTS

| | | | | |
|---|---|---|---|---|
| 5,822,244 | A | * | 10/1998 | Hansen et al. ............ 365/185.11 |
| 5,912,848 | A | * | 6/1999 | Bothwell ...................... 365/195 |
| 2007/0239926 | A1 | * | 10/2007 | Gyl et al. ...................... 711/103 |
| 2010/0306586 | A1 | | 12/2010 | Hanaoka et al. |
| 2011/0055453 | A1 | * | 3/2011 | Bennett ......................... 711/103 |
| 2012/0072628 | A1 | * | 3/2012 | Crockett et al. .............. 710/110 |
| 2012/0137093 | A1 | | 5/2012 | Ferrario et al. |

FOREIGN PATENT DOCUMENTS

EP   1764803 A1   3/2007

* cited by examiner

*Primary Examiner* — Khanh Dang

(74) *Attorney, Agent, or Firm* — Leydig, Voit & Mayer, Ltd.

(57) ABSTRACT

The present invention relates to a reset method and a network device. The method includes: receiving, by an SPI Flash, a reset instruction sent by a processor; and performing reset processing corresponding to the reset instruction according to the reset instruction, where the reset instruction includes interrupting a current operation, recording interruption state information when the current operation is interrupted, and setting a current state to a state of responding to a read instruction of the processor; after finishing the reset operation, sending, by the processor, a read instruction to the SPI Flash, and receiving interruption state information sent by the SPI Flash according to the read instruction; and then determining, according to the interruption state information, whether the interrupted operation in the SPI Flash needs to be continued, and if yes, sending an instruction of continuing the interrupted operation to the SPI Flash.

10 Claims, 2 Drawing Sheets

RESET METHOD AND NETWORK DEVICE

CROSS-REFERENCE TO RELATED APPLICATION

This application claims priority to Chinese Patent Application No. 201210447224.8, filed on Nov. 9, 2012, which is hereby incorporated by reference in its entirety.

TECHNICAL FIELD

The present invention relates to the field of computer technologies, and in particular, to a reset method and a network device.

BACKGROUND

A serial peripheral interface flash (SPI Flash) is capable of synchronously performing serial data transmission with a processor through an SPI interface. Through the SPI interface, the processor is capable of performing read and write operations on the SPI Flash. The SPI interface needs only four signal cables, namely, a chip select (CS) signal cable, an SPI clock (SCLK) signal cable, a master output slave input (MOSI) signal cable, and a master input slave output (MISO) signal cable, so that pin resources of the processor are saved.

Generally, when the SPI Flash is performing an erase operation or a programming operation, even if the processor sends a read instruction to the SPI Flash, the Flash refuses to respond. Under this mechanism, after the processor started by using the SPI Flash is reset completely, the processor begins to read software code data from the SPI Flash. If the Flash is performing an erase operation before the processor is reset and the SPI Flash does not finish the erase operation when the processor is reset completely and begins to read software code data, the Flash refuses to respond to a read data instruction sent from the processor, that is, no data is output in a data output signal cable of the SPI Flash, while the processor considers that the data read operation is already completed. Therefore, the processor may read incorrect software code data from the SPI Flash, and incorrect software codes are run, which results in that programs of the processor are run incorrectly or a system cannot be started, thereby greatly reducing reliability of the system.

SUMMARY

The present invention provides a reset method and a network device, so that when a processor performs a reset operation, an SPI Flash connected to the processor is in an accessible state for the processor, thereby increasing system reliability.

In a first aspect, the present invention provides a reset method, including:

receiving, by a serial peripheral interface flash, a reset instruction sent by a processor;

performing, by the SPI Flash, reset processing corresponding to the reset instruction according to the reset instruction, where the reset processing includes interrupting a current operation, recording interruption state information when the current operation is interrupted, and setting a current state of the SPI Flash to a state of responding to a read instruction of the processor;

after finishing the reset operation, sending, by the processor, a read instruction to the SPI Flash;

receiving, by the processor, the interruption state information in a reset register sent by the SPI Flash according to the read instruction; and determining, by the processor according to the interruption state information, whether the interrupted current operation needs to be continued, and if yes, sending an instruction of continuing the interrupted current operation to the SPI Flash.

In a second aspect, the present invention provides a network device, including a processor and an SPI Flash, where the processor includes a first reset pin, a serial peripheral interface SPI master controller, a master output pin, and a master input pin, and the SPI Flash includes a reset register, a second reset pin, a logic controller, a slave input pin, and a slave output pin;

the first reset pin and the second reset pin are connected through a reset signal cable, the master output pin and the slave input pin are connected through an output signal cable, and the master input pin and the slave output pin are connected through an input signal cable;

the slave input pin of the SPI Flash receives a reset instruction sent by the processor through the output signal cable; the logic controller performs reset processing corresponding to the reset instruction according to the reset instruction, where the reset processing includes interrupting a current operation, recording interruption state information when the current operation is interrupted in the reset register, and setting a current state to a state of responding to a read instruction of the processor; and after the reset operation is completed, the SPI master controller controls the master output pin to send a read instruction to the SPI Flash through the output signal cable; the master input pin receives the interruption state information in the reset register sent by the SPI Flash according to the read instruction, where the interruption state information is sent by the SPI Flash through the input signal cable; and the processor determines, according to the interruption state information, whether the interrupted current operation in the SPI Flash needs to be continued, and if yes, sends an instruction of continuing the interrupted current operation to the SPI Flash through the output signal cable.

In the technical solutions provided in the present invention, when a processor that can be started only by using an external SPI Flash performs a reset operation, the processor sends a reset instruction to the SPI Flash, so that the SPI Flash also performs reset processing operations, where the reset processing operations include interrupting a current operation, recording interruption state information when the current operation is interrupted, and setting a current state to a state of responding to a read instruction of the processor. In this way, after finishing the reset operation, the processor reads interruption state information stored in the SPI Flash, determines whether the interrupted current operation needs to be continued, and if yes, continues to perform the interrupted current operation. Therefore, in the present invention, when a processor performs a reset operation, an SPI Flash connected to the processor is in an accessible state for the processor, thereby increasing system reliability.

DESCRIPTION OF EMBODIMENTS

For the purpose of description rather than limitation, the following provides specific details such as specified system structures, interfaces, and technologies to help understand the present invention thoroughly. However, persons skilled in the art should clearly understand that the present invention can also be implemented in other embodiments without these specific details. In other cases, details of commonly known apparatuses, circuits, and methods are omitted to avoid that the descriptions of the present invention are limited by unnecessary details.

Embodiments of the present invention provide a reset method and a network device with respect to defects of a current reset method. When a processor started by using an SPI Flash performs a reset operation, the processor sends a reset instruction to the SPI Flash connected to the processor; when receiving the reset instruction sent by the processor, the SPI Flash performs reset processing corresponding to the reset instruction according to the reset instruction, where the reset processing includes interrupting a current operation, recording interruption state information when the current operation is interrupted, and setting a current state to a state of responding to a read instruction of the processor. After finishing the reset operation, the processor sends a read instruction to the SPI Flash, receives interruption state information in a reset register sent by the SPI Flash according to the read instruction, and determines, according to the interruption state information, whether the interrupted operation in the SPI Flash needs to be continued; if it is determined that the interrupted operation needs to be continued, the processor continues to perform the interrupted operation for the SPI Flash according to the interruption state information. Therefore, in embodiments of the present invention, when a processor performs a reset operation, an SPI Flash connected to the processor is in an accessible state for the processor, thereby increasing system reliability.

Figure 1:
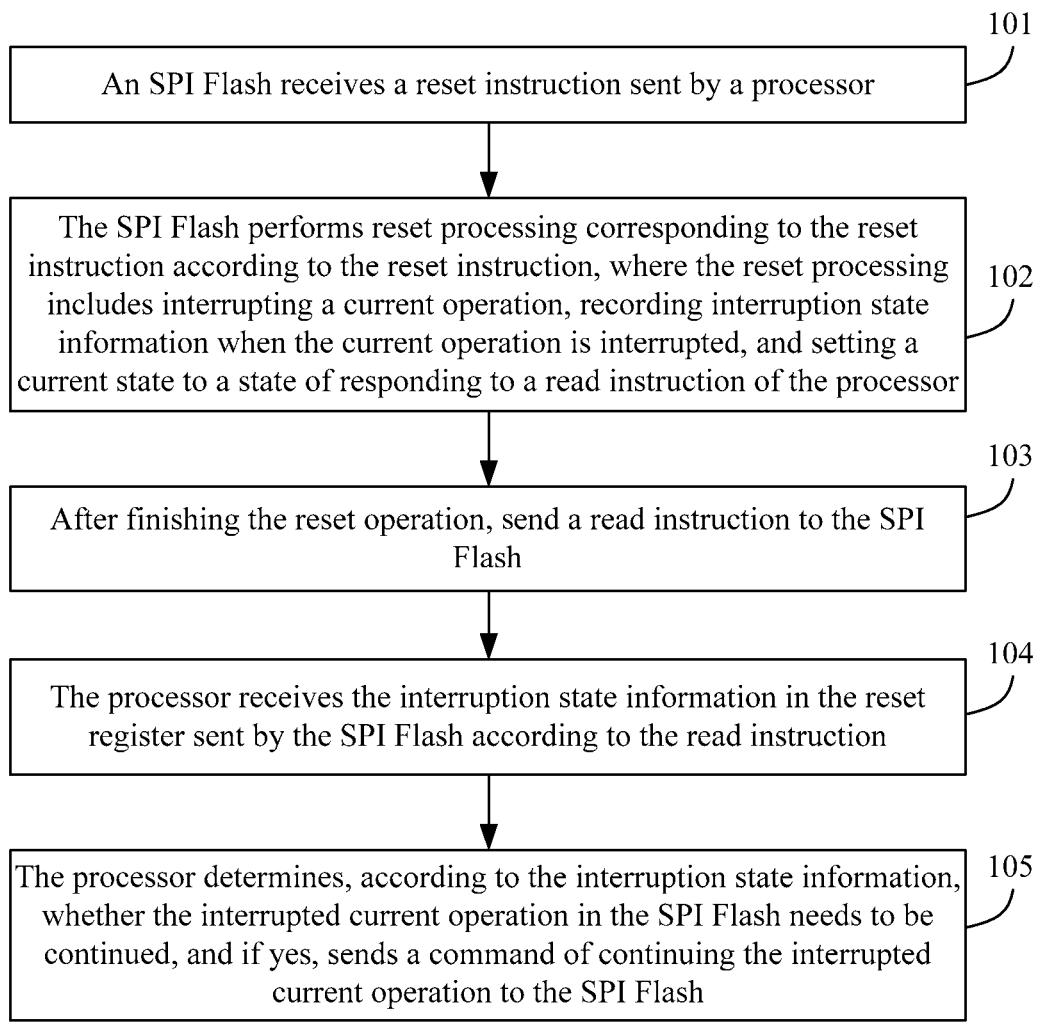
FIG. 1 is a flowchart of a reset method according to an embodiment of the present invention.

FIG. 1 is a flowchart of a reset method according to an embodiment of the present invention. An executor of this embodiment is a network device including an SPI Flash and a processor. In this embodiment, a method for increasing system reliability is described in detail, where when the processor performs a reset operation, the SPI Flash connected to the processor is enabled to perform reset processing. As shown in FIG. 1, this embodiment includes the following steps:

Step 101: An SPI Flash receives a reset instruction sent by a processor.

To implement the technical solution provided in this embodiment of the present invention, in practical applications, an external reset pin is added to the SPI Flash, where the reset pin is capable of receiving a reset instruction sent by the processor.

Step 102: The SPI Flash performs reset processing corresponding to the reset instruction according to the reset instruction, where the reset processing includes interrupting a current operation, recording interruption state information when the current operation is interrupted, and setting a current state to a state of responding to a read instruction of the processor.

After the external reset pin receives the reset instruction, the SPI Flash is capable of performing reset processing operations according to the reset instruction, where the reset processing operations include interrupting a current operation, recording interruption state information when the current operation is interrupted, and setting a current state of the SPI Flash to a state of responding to a read instruction of the processor.

To implement the technical solution provided in this embodiment of the present invention, in practical applications, a reset register is added into the SPI Flash, where the reset register is capable of storing interruption state information of an interrupted operation in the SPI Flash.

The current operation being performed by the SPI Flash may be a programming operation or an erase operation; when a programming operation is interrupted, interruption state information that can be recorded includes an operation state, a programmed area, a programmed address, an area to be programmed, and an address to be programmed, and the interruption state information can be recorded in the reset register; for the programming operation, operation data failing to be programmed can further be stored in a data buffer of the SPI Flash. When the erase operation is interrupted, interruption state information that can be recorded includes an erased sector, an erased address, whether the erasing succeeds, a sector to be erased, and an address to be erased, and the interruption state information can be stored in the reset register.

Step 103: After finishing the reset operation, the processor sends a read instruction to the SPI Flash.

When the processor finishes its own reset operation and after the system is started, the processor may send a read instruction to the SPI Flash to read content in the reset register.

Step 104: The processor receives the interruption state information in the reset register sent by the SPI Flash according to the read instruction.

Because the SPI Flash already sets a local state to a state of responding to the read instruction of the processor, the SPI Flash is capable of receiving the read instruction that is used to read content in the reset register and sent by the processor, and responds to the read instruction, that is, the SPI Flash sends the interruption state information in the reset register to the processor.

Because the SPI Flash records the interruption state information in the reset register, the SPI Flash is capable of sending the stored interruption state information to the processor after receiving the read instruction sent by the processor.

Step 105: The processor determines, according to the interruption state information, whether the interrupted current operation in the SPI Flash needs to be continued, and if yes, sends an instruction of continuing the interrupted current operation to the SPI Flash.

When the interrupted operation is a programming operation, after receiving the interruption state information, the processor may determine, according to the interruption state information, whether the interrupted operation needs to be continued, and if yes, sends an instruction of continuing the programming operation to the SPI Flash by using the address to be programmed in the interruption state information as a programming address for performing a programming operation on the SPI Flash and using the operation data failing to be programmed in the data buffer as programming data for performing the programming operation on the SPI Flash, where the instruction carries the address to be programmed and the operation data failing to be programmed that are read from the interruption state information. After receiving the instruction of continuing the programming operation, the SPI Flash continues to perform the interrupted programming operation according to the instruction to avoid losing important data.

When the interrupted operation is an erase operation, after receiving the interruption state information, the processor may determine, according to the interruption state information, whether the interrupted operation needs to be continued, and if yes, sends an instruction of continuing the erase operation to the SPI Flash by using the sector to be erased and the address to be erased in the interruption state information as an erased sector and an erased address for performing an erase operation on the SPI Flash, where the instruction carries the address to be erased and the sector to be erased that are read from the interruption state information. After receiving the instruction of continuing the erase operation, the SPI Flash continues to perform the interrupted erase operation according to the instruction to prevent the area to be erased or data to be erased from causing the system to fail to run or run with an error.

In an optional implementation, when the SPI Flash stores operation data failing to be programmed in the data buffer of the SPI Flash, it also stores a checksum of the operation data failing to be programmed, namely, a first checksum. Before step 105 is performed, the operation data failing to be programmed and the first checksum of the operation data failing to be programmed are firstly read from the data buffer of the SPI Flash, and then checksum calculation is performed on the read operation data failing to be programmed to obtain a second checksum; and whether the first checksum is the same as the second checksum is determined; if the first checksum is the same as the second checksum, step 105 is performed. The algorithm of performing checksum calculation on the read operation data failing to be programmed is the same as the algorithm of calculating the first checksum.

In this embodiment of the present invention, during the resetting of a processor, an SPI Flash connected to the processor is enabled to perform a corresponding reset processing operation. In this way, when the processor performs a reset operation, the SPI Flash connected to the processor is in an accessible state for the processor, thereby increasing system reliability.

Figure 2:
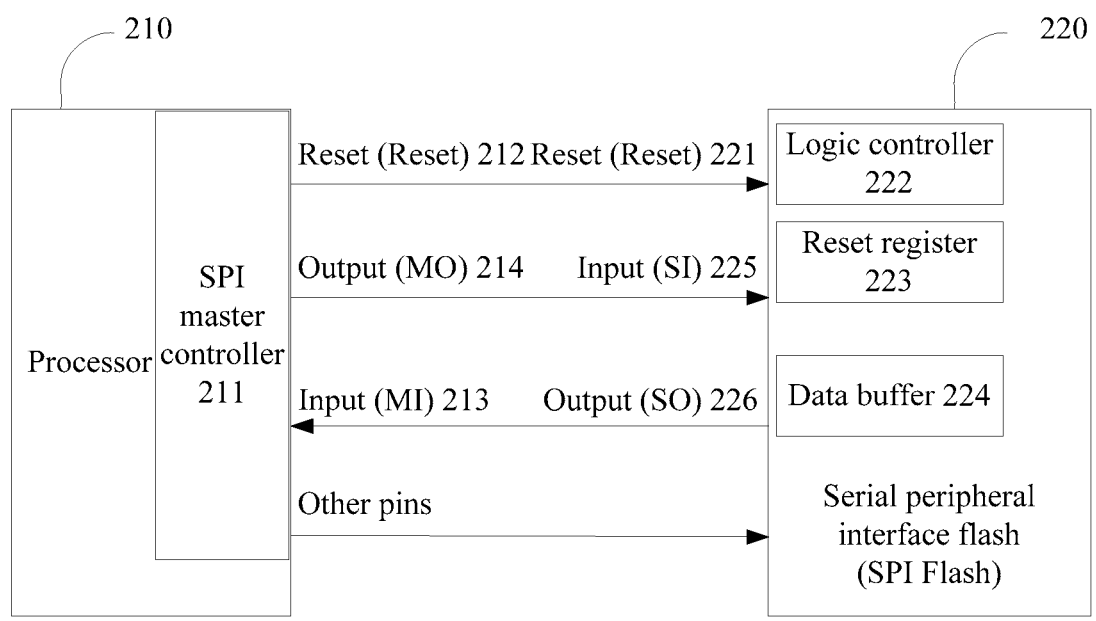
FIG. 2 is a schematic diagram of a network device according to an embodiment of the present invention.

Accordingly, an embodiment of the present invention further provides a network device. FIG. 2 is a schematic diagram of a network device according to an embodiment of the present invention. As shown in FIG. 2, the network device includes a processor 210 and an SPI Flash 220, where the processor 210 includes an SPI master controller 211, a first reset (Reset) pin 212, and further includes a master output (MO) pin 213, a master input (MI) pin 214; the SPI Flash 220 includes a second reset (Reset) pin 221, a logic controller 222, a reset register 223, a data buffer 224, and further includes a slave input (SI) pin 225, a slave output (SO) pin 226, and the like.

The first reset pin and the second reset pin are connected through a reset signal cable, the master output pin and the slave input pin are connected through an output signal cable, and the master input pin and the slave output pin are connected through an input signal cable. Certainly, the SPI Flash further includes a chip select pin and a serial clock pin, and the processor also includes a chip select pin and a serial clock pin. The chip select pin of the SPI Flash and the chip select pin of the processor are connected through a chip select signal cable, and the serial clock pin of the SPI Flash and the serial clock pin of the processor are connected through a serial clock signal cable.

Before sending a reset instruction to the SPI Flash through the output signal cable, the processor further sends a reset trigger signal to the SPI Flash through the reset signal cable to inform the logic controller 222 that an instruction subsequently received by the output signal cable is a reset instruction.

The slave input pin of the SPI Flash 220 receives a reset instruction sent by the processor through the output signal cable; the logic controller performs reset processing corresponding to the reset instruction according to the reset instruction, where the reset processing includes interrupting a current operation, recording interruption state information when the current operation is interrupted in the reset register, and setting a current state to a state of responding to a read instruction of the processor.

After the reset operation is completed, the SPI master controller controls the master output pin to send a read instruction to the SPI Flash through the output signal cable; the master input pin receives the interruption state information in the reset register sent by the SPI Flash according to the read instruction, where the interruption state information is sent by the SPI Flash through the input signal cable; the processor determines, according to the interruption state information, whether the interrupted current operation in the SPI Flash needs to be continued, and if yes, sends an instruction of continuing the interrupted current operation to the SPI Flash through the output signal cable.

The current operation performed by the SPI Flash 220 may be a programming operation or an erase operation. The operation of recording, by the SPI, the interruption state information when the current operation is interrupted is specifically: recording erase interruption state information of the erase operation in the reset register 223; or recording programming interruption state information of the programming operation in the reset register 223, and storing programming data corresponding to the programming operation in the data buffer 224. When the programming operation is interrupted, the interruption state information that can be recorded includes an operation state, a programmed area, a programmed address, an area to be programmed, and an address to be programmed, and the interruption state information can be recorded in the reset register 223; for the programming operation, operation data failing to be programmed can further be stored in the data buffer 224 of the SPI Flash 220. When the erase operation is interrupted, interruption state information that can be recorded includes an erased sector, an erased address, whether the erasing succeeds, a sector to be erased, and an address to be erased, and the interruption state information can be stored in the reset register 223.

Specifically, when the interrupted operation is a programming operation, after receiving the interruption state information, the processor 210 may determine, according to the interruption state information, whether the interrupted operation needs to be continued, and if yes, sends an instruction of continuing the programming operation to the SPI Flash 220 by using the address to be programmed in the interruption state information as a programming address for performing a programming operation on the SPI Flash 220 and using the operation data failing to be programmed in the data buffer 224 as programming data for performing the programming operation on the SPI Flash 220, where the instruction carries the address to be programmed and the operation data failing to be programmed that are read from the interruption state information. After receiving the instruction of continuing the programming operation, the SPI Flash 220 continues to perform the interrupted programming operation according to the instruction to avoid losing important data.

When the interrupted operation is an erase operation, after receiving the interruption state information, the processor 210 may determine, according to the interruption state information, whether the interrupted operation needs to be continued, and if yes, sends an instruction of continuing the erase operation to the SPI Flash 220 by using the sector to be erased and the address to be erased in the interruption state information as an erased sector and an erased address for performing an erase operation on the SPI Flash 220, where the instruction carries the address to be erased and the sector to be erased that are read from the interruption state information. After receiving the instruction of continuing the erase operation, the SPI Flash 220 continues to perform the interrupted erase operation according to the instruction to prevent the area to be erased or data to be erased from causing the system to fail to run or run with an error.

In an optional implementation, when the SPI Flash 220 stores operation data failing to be programmed in the data buffer 224 of the SPI Flash 220, it also stores a checksum of the operation data failing to be programmed, namely, a first checksum. Before the determining whether the interrupted operation needs to be continued is performed, the operation data failing to be programmed and the first checksum of the operation data failing to be programmed are firstly read from the data buffer 224 of the SPI Flash 220, and then checksum calculation is performed on the read operation data failing to be programmed to obtain a second checksum; and whether the first checksum is the same as the second checksum is determined; if the first checksum is the same as the second checksum, the step of determining whether the interrupted operation needs to be continued is performed. The algorithm of performing checksum calculation on the read operation data failing to be programmed is the same as the algorithm of calculating the first checksum.

In this embodiment of the present invention, during the resetting of a processor, an SPI Flash connected to the processor is enabled to perform a corresponding reset processing operation. In this way, when the processor performs a reset operation, the SPI Flash connected to the processor is in an accessible state for the processor, thereby increasing system reliability.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A reset method, comprising:
    receiving, via a reset pin by a serial peripheral interface flash (SPI Flash), a reset instruction sent by a processor;
    performing, by the SPI Flash, reset processing in response to the reset instruction, wherein the reset processing comprises interrupting a current operation, recording interruption state information when the current operation is interrupted, and setting a current state of the SPI Flash to a state of responding to a read instruction of the processor;
    performing, by the processor, a reset operation on the processor;
    after finishing the reset operation, sending, by the processor, a read instruction to the SPI Flash;
    receiving, by the processor, the interruption state information in a reset register sent by the SPI Flash according to the read instruction; and
    determining, by the processor according to the interruption state information, whether the interrupted current operation needs to be continued, and if yes, sending an instruction of continuing the interrupted current operation to the SPI Flash.

2. The reset method according to claim 1, wherein if the current operation is an erase operation, the recording interruption state information when the current operation is interrupted comprises:
    recording erase interruption state information of the erase operation in a reset register.

3. The reset method according to claim 1, wherein if the current operation is a programming operation, the recording interruption state information when the current operation is interrupted comprises: recording programming interruption state information of the programming operation in a reset registe, and storing programming data corresponding to the programming operation in a data buffer.

4. The reset method according to claim 2, wherein the sending the instruction of continuing the interrupted current operation to the SPI Flash comprises: sending an erase instruction of continuing the interrupted erase operation to the SPI Flash, wherein the erase instruction carries an address to be erased and a sector to be erased that are obtained from the interruption state information.

5. The reset method according to claim 3, wherein the sending the instruction of continuing the interrupted current operation to the SPI Flash comprises: sending a programming instruction of continuing the interrupted programming operation to the SPI Flash, wherein the programming instruction carries an address to be programmed that is obtained from the interruption state information and operation data failing to be programmed that is obtained from the data buffer.

6. A network device, comprising a processor and a serial peripheral interface flash (SPI Flash), wherein the processor comprises a first reset pin, a SPI master controller, a master output pin, and a master input pin, and the SPI Flash comprises a reset register, a second reset pin, a logic controller, a slave input pin, and a slave output pin;
    the first reset pin and the second reset pin are connected through a reset signal cable, the master output pin and the slave input pin are connected through an output signal cable, and the master input pin and the slave output pin are connected through an input signal cable;
    the slave input pin of the SPI Flash is configured to receiver a reset instruction sent by the processor through the output signal cable; the logic controller is configured to perform reset processing in response to the reset instruction, wherein the reset processing comprises interrupting a current operation, recording interruption state information in the reset register when the current operation is interrupted, and setting a current state to a state of responding to a read instruction of the processor; and
    the SPI master controller is configured to control the master output pin to send a read instruction to the SPI Flash through the output signal cable, after a reset operation of the processor is completed; the master input pin is configured to receive the interruption state information in the reset register sent by the SPI Flash according to the read instruction, wherein the interruption state information is sent by the SPI Flash through the input signal cable; and the processor is configured to determine according to the interruption state information, whether the interrupted current operation in the SPI Flash needs to be continued, and if yes, send an instruction of continuing the interrupted current operation to the SPI Flash through the output signal cable.

7. The network device according to claim 6, wherein if current operation is an erase operation, the SPI Flash is configured to record erase interruption state information of the erase operation in the reset register.

8. The network device according to claim 6, wherein the SPI Flash further comprises a data buffer; if the current operation is a programming operation, the SPI Flash is configured to record programming interruption state information of the programming operation in the reset register, and stores programming data corresponding to the programming operation in the data buffer.

9. The network device according to claim 7, wherein if the current operation is an erase operation, the processor is configured to send an erase instruction of continuing the interrupted erase operation to the SPI Flash, wherein the erase instruction carries an address to be erased and a sector to be erased that are obtained from the interruption state information.

10. The network device according to claim 8, wherein if the current operation is a programming operation, the processor is configured to send a programming instruction of continuing the interrupted programming operation to the SPI Flash, wherein the programming instruction carries an address to be programmed that is obtained from the interruption state information and operation data failing to be programmed that is obtained from the data buffer.

* * * * *